United States Patent
Tran et al.

(10) Patent No.: US 9,821,659 B2
(45) Date of Patent: Nov. 21, 2017

(54) ULTRASONIC WADING DETECTION FOR A VEHICLE

(75) Inventors: Thuy-Yung Tran, Whitley (GB); Edward Hoare, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 676 days.

(21) Appl. No.: 13/994,483

(22) PCT Filed: Dec. 15, 2011

(86) PCT No.: PCT/EP2011/072998
§ 371 (c)(1),
(2), (4) Date: Sep. 3, 2013

(87) PCT Pub. No.: WO2012/080439
PCT Pub. Date: Jun. 21, 2012

(65) Prior Publication Data
US 2013/0336090 A1    Dec. 19, 2013

(30) Foreign Application Priority Data

Dec. 15, 2010 (GB) .................................. 1021268.6
Dec. 15, 2010 (GB) .................................. 1021272.8
Dec. 15, 2010 (GB) .................................. 1021278.5
Dec. 15, 2010 (GB) .................................. 1021295.9

(Continued)

(51) Int. Cl.
*G01S 15/02* (2006.01)
*B60K 35/00* (2006.01)
(Continued)

(52) U.S. Cl.
CPC ................ *B60K 35/00* (2013.01); *B60C 1/00* (2013.01); *B60G 17/019* (2013.01); *B60G 17/0165* (2013.01); *B60G 17/01908* (2013.01); *B60K 37/02* (2013.01); *B60R 99/00* (2013.01); *B60W 40/06* (2013.01); *B60W 40/076* (2013.01);
(Continued)

(58) Field of Classification Search
CPC . B60G 17/0165; B60W 40/06; B60W 40/076; B60W 50/14; F02D 11/105; G01S 15/02; G10K 13/00; G06F 7/00; B60K 35/00; B60K 37/02; G01F 23/18;
(Continued)

(56) References Cited

U.S. PATENT DOCUMENTS 3,392,694 A    7/1968 Appleton
4,107,994 A *  8/1978 Sogo ........................... 73/290 V
(Continued)

FOREIGN PATENT DOCUMENTS

DE        19941126 A1    4/2001
DE    102004028157 B3    1/2006
(Continued)

OTHER PUBLICATIONS

International Search Report for PCT/EP2011/072998 dated May 16, 2012, 6 pages.

*Primary Examiner* — Luke Ratcliffe
*Assistant Examiner* — Amie M N'Dure
(74) *Attorney, Agent, or Firm* — Reising Ethington P.C.

(57) ABSTRACT

A wading sensor for a vehicle comprises an ultrasonic parking distance control. An embodiment detects wading by sensing the difference in the settling time of the diaphragm of a transmitter/receiver, in water and in air. Other embodiments are disclosed.

18 Claims, 8 Drawing Sheets

(30) Foreign Application Priority Data

Dec. 15, 2010 (GB) .................................. 1021296.7
Dec. 15, 2010 (GB) .................................. 1021297.5

(51) Int. Cl.

| | | |
|---|---|---|
| G01F 23/28 | (2006.01) | |
| B60G 17/019 | (2006.01) | |
| G01F 23/18 | (2006.01) | |
| B60G 17/0165 | (2006.01) | |
| B60W 40/06 | (2012.01) | |
| B60W 40/076 | (2012.01) | |
| B60W 50/14 | (2012.01) | |
| B60K 37/02 | (2006.01) | |
| F02D 11/10 | (2006.01) | |
| G01F 23/14 | (2006.01) | |
| G10K 13/00 | (2006.01) | |
| B60C 1/00 | (2006.01) | |
| B60R 99/00 | (2009.01) | |
| G01F 23/24 | (2006.01) | |
| G01F 23/26 | (2006.01) | |
| G06F 7/00 | (2006.01) | |
| G01K 13/00 | (2006.01) | |
| G01S 15/93 | (2006.01) | |
| G01S 15/87 | (2006.01) | |
| G01F 23/00 | (2006.01) | |
| G01F 23/296 | (2006.01) | |

(52) U.S. Cl.

CPC ........... B60W 50/14 (2013.01); F02D 11/105 (2013.01); G01F 23/0061 (2013.01); G01F 23/0076 (2013.01); G01F 23/14 (2013.01); G01F 23/18 (2013.01); G01F 23/24 (2013.01); G01F 23/242 (2013.01); G01F 23/263 (2013.01); G01F 23/265 (2013.01); G01F 23/28 (2013.01); G01F 23/2965 (2013.01); G01K 13/00 (2013.01); G01S 15/02 (2013.01); G01S 15/87 (2013.01); G01S 15/931 (2013.01); G06F 7/00 (2013.01); G10K 13/00 (2013.01); B60G 2300/07 (2013.01); B60G 2400/80 (2013.01); B60G 2400/843 (2013.01); B60G 2500/30 (2013.01); B60G 2800/914 (2013.01); B60K 2350/1076 (2013.01); B60W 2050/146 (2013.01); B60W 2420/54 (2013.01); B60W 2520/16 (2013.01); B60W 2520/18 (2013.01); B60W 2550/14 (2013.01); B60W 2550/142 (2013.01); B60W 2550/147 (2013.01); G01F 23/00 (2013.01); G01F 23/296 (2013.01); G01S 2015/932 (2013.01); G01S 2015/938 (2013.01); Y02T 10/84 (2013.01); Y10S 367/908 (2013.01); Y10S 903/93 (2013.01)

(58) Field of Classification Search

CPC ............ G01F 23/0061; G01F 23/0076; G01F 23/2965; G01F 23/14; G01F 23/242; G01F 23/265

USPC .......................................................... 367/13
See application file for complete search history.

(56) References Cited

U.S. PATENT DOCUMENTS

| | | | | |
|---|---|---|---|---|
| 4,144,517 | A | * | 3/1979 | Baumoel ............ G01F 23/2961 367/93 |
| 5,173,692 | A | | 12/1992 | Shapiro et al. |
| 5,521,594 | A | | 5/1996 | Fukushima |
| 5,978,736 | A | | 11/1999 | Greendale |
| 6,430,985 | B1 | | 8/2002 | Drees |
| 8,270,255 | B2 | * | 9/2012 | Cuschieri et al. ............ 367/154 |
| 8,473,173 | B1 | | 6/2013 | Robles |
| 9,026,310 | B2 | | 5/2015 | Tran et al. |
| 2003/0005765 | A1 | | 1/2003 | Brudis et al. |
| 2004/0011126 | A1 | * | 1/2004 | Otto ...................... G01F 23/284 73/290 R |
| 2005/0170710 | A1 | | 8/2005 | Darby et al. |
| 2005/0284218 | A1 | | 12/2005 | Lagergren |
| 2006/0113129 | A1 | | 6/2006 | Tabata |
| 2007/0007056 | A1 | | 1/2007 | Bowers et al. |
| 2007/0167092 | A1 | | 7/2007 | Rees et al. |
| 2007/0174013 | A1 | * | 7/2007 | Liescheski ...................... 702/85 |
| 2007/0221430 | A1 | | 9/2007 | Allison, Sr. |
| 2007/0244606 | A1 | | 10/2007 | Zhang et al. |
| 2008/0030313 | A1 | | 2/2008 | Obradovich |
| 2008/0319618 | A1 | | 12/2008 | Sjogren et al. |
| 2009/0030581 | A1 | | 1/2009 | Pollklas et al. |
| 2009/0150035 | A1 | | 6/2009 | Soliman et al. |
| 2009/0159020 | A1 | * | 6/2009 | Hall et al. .................. 123/41.11 |
| 2010/0057324 | A1 | | 3/2010 | Glugla et al. |
| 2010/0085198 | A1 | | 4/2010 | Boss et al. |
| 2010/0101226 | A1 | | 4/2010 | Shutty et al. |
| 2013/0307679 | A1 | | 11/2013 | Tran et al. |
| 2014/0085066 | A1 | | 3/2014 | Tran et al. |
| 2014/0156126 | A1 | | 6/2014 | Tran et al. |
| 2014/0184247 | A1 | | 7/2014 | Tran et al. |
| 2014/0288793 | A1 | | 9/2014 | Tran et al. |
| 2014/0293746 | A1 | | 10/2014 | Tran et al. |
| 2014/0347178 | A1 | | 11/2014 | Tran et al. |
| 2015/0033846 | A1 | | 2/2015 | Tran et al. |

FOREIGN PATENT DOCUMENTS

| | | | |
|---|---|---|---|
| DE | 102005038345 A1 | 2/2007 | |
| DE | 102008042016 A1 | 3/2010 | |
| FR | 2622639 A1 | 5/1989 | |
| GB | 2356602 A * | 5/2001 | ............ B60K 31/00 |
| GB | 2376929 A * | 12/2002 | ............ B60K 28/00 |
| GB | 2486958 A * | 7/2012 | |
| JP | 2008203205 A * | 9/2008 | |
| KR | 20110109614 A | 10/2011 | |
| KR | 20110109618 A | 10/2011 | |
| NL | 1011780 C2 | 10/2000 | |
| RU | 2168419 C1 | 6/2001 | |
| WO | WO 03/002378 A1 | 1/2003 | |
| WO | WO2009013606 A2 | 1/2009 | |

* cited by examiner

ULTRASONIC WADING DETECTION FOR A VEHICLE

TECHNICAL FIELD

This invention relates to a system for a vehicle, and particularly, but not exclusively to an indication or detection system, for the detection of a fluid, for example, water at a wading depth. Aspects of the invention relate to an apparatus, to a method, to a system, to a vehicle and to a program.

BACKGROUND

Road vehicles may be designed to travel through a body of water to a finite depth, which may be referred to as a maximum wading depth. Beyond this limit there is a risk that the vehicle engine and electronics may be damaged. Identifying that a vehicle has entered a wading situation or is in a wading event is advantageous so that control systems of the vehicle can be deployed.

WO-A-03/002378 discloses the use of ultrasonic parking distance control (PDC) sensors to determine the likelihood of a vehicle being at least partially immersed in a fluid, such as water. Due to the detection of an object at approximately zero distance by more than one parking sensor, in conjunction with the detection of other conditions, for example vehicle speed and user selected "off-road" state; the system disclosed in WO-A-03/002378 is configured to determine that a vehicle is likely to be in a wading situation. It is recognized however that the detection of an object by more than one parking sensor simultaneously may be for reasons other than a wading event and that it is desirable to have a more positive determination that a vehicle is in a wading situation.

The present invention seeks to provide an improvement in the field of liquid, (particularly, water), immersion detection systems that has particular application for vehicles. The invention may be utilised in applications other than for vehicles; for example, it is envisaged that embodiments of the invention may have application in buildings, for example domestic houses, where the automatic detection of water at a certain level may be useful. Such a system may be adapted, for example, to effect automatic deployment of flood defence systems.

SUMMARY

Aspects of the invention provide an apparatus, a system, a vehicle, a program and a method as claimed in the appended claims.

According to another aspect of the invention for which protection is sought there is provided a system for indicating wading of a vehicle comprising an acoustic or ultrasonic emitter/receiver sensor, the sensor having a diaphragm which vibrates in use, and a control unit configured to measure the settling time of the diaphragm.

Optionally, the settling time may be measured between successive activations of the sensor.

Optionally, the control unit may be configured to output a signal indicative of vehicle wading when the measured settling time of the diaphragm corresponds to a settling time of that diaphragm when under water and/or when the measured settling time of the diaphragm is significantly less than an expected settling time when the diaphragm is in air.

Further optionally, the system may comprise a tilt sensor indicative of vehicle fore and aft inclination, said control unit being configured to predict depth of water at a predetermined distance in advance of the vehicle.

Optionally, the system may further comprise a water depth sensor. Optionally, the said depth sensor may comprise a downward facing ultrasonic emitter/receiver device for detecting the surface of water.

Further optionally, said depth sensor may be enabled only when said wading indicator indicates wading.

Optionally, said control unit may be configured to recalibrate the output of a parking sensor for operation under water, so as to indicate the range of immersed objects.

Additionally or alternatively, said control unit may automatically recalibrate the output of a parking sensor when wading is detected, optionally by that parking sensor.

According to another aspect of the invention for which protection is sought there is provided a method of detecting the presence of water comprising:
 (i) driving an acoustic or ultrasonic transducer with an oscillating electrical signal;
 (ii) measuring the response of a diaphragm to said oscillating electrical drive signal;
 (iii) determining a settling time of the diaphragm;
 (iv) comparing the measured settling time of the diaphragm with an expected value of settling time of the diaphragm in water and/or in air.

Optionally, the method may comprise: comparing the measured settling time of the diaphragm and if it is at least twice as fast as an expected settling time of the diaphragm when disposed in air, determining that the ultrasonic transducer is disposed in water.

Optionally the method may comprise positioning the ultrasonic sensor on a lowerpart of a vehicle and using the step of comparing the measured settling time to determine that a vehicle is at least partially disposed in water up to the height of the positioned sensor.

According to a further aspect of the invention for which protection is sought there is provided a program executable by a control unit as described in the relevant preceding paragraphs, configured to compare a measured settling time with an expected settling time for the diaphragm in air and/or with an expected settling time for the diaphragm in water and to determine whether a sensor is disposed in water.

According to another aspect of the present invention for which protection is sought there is provided a wading indicator for a vehicle, said indicator comprising an acoustic or ultrasonic emitter/receiver device having a diaphragm which vibrates in use, and a control unit configure to measure the diaphragm settling time.

Optionally, the control unit is configured to measure the diaphragm settling time between successive activations thereof.

Optionally the emitter/receiver device is a transducer and optionally an ultrasonic transducer optionally of the type also used as parking distance control (PDC) sensors, particularly a parking distance sensor.

Such an arrangement utilises a measurable difference between the settling time of a diaphragm when oscillating in air and the settling time of the same diaphragm when oscillating in water, the latter being significantly faster to determine whether a sensor and a vehicle upon which the sensor may be mounted is immersed in air or water. Optionally, a diaphragm may be intermittently driven by an oscillating electrical signal and a time interval between successive activations, or signal pulses driving the oscillations, may be selected to be greater than the settling time of the diaphragm. Accordingly the control unit can provide an input to a vehicle data bus or vehicle CAN indicative of such a device being underwater. The sensors will optionally be mounted on a vehicle at bumper height, which is a suitable height for detecting wading.

The measurement of settling time better allows the presence of water at the diaphragm to be distinguished from mere mechanical pressure on the device. Detecting settling time for several devices may give increased confidence that the vehicle is partly immersed.

Embodiments of the invention may further include a vehicle tilt sensor indicative of fore and aft vehicle inclination whereby the control unit is adapted to give a predictive indication of water depth at a point ahead of the vehicle. Thus upon first sensing of water, the control unit will assume a constant angle of vehicle advance, and thus be able to give advance warning of the distance beyond which the safe wading depth of the vehicle will be exceeded, for example by message or graphic on the driver display. The control unit may also be adapted to prepare or enable other vehicle systems for deeper water. Similarly prediction of a vehicle leaving water may be made by this means, and thus give an appropriate indication to a driver, and/or prepare, and/or enable vehicle systems for dry land.

In such an embodiment, a change in vehicle fore and aft inclination may also be detected by continual or intermittent sampling of outputs of a vehicle tilt sensor, so that the control unit may be configured to give predictive information of a likely change in slope, and thus whether the slope may be increasing or decreasing.

According to another aspect of the invention there is provided a method of indicating wading of a vehicle fitted with an ultrasonic emitter/receiver device, the method comprising determining the settling time in air of the diaphragm of a sensor, repeatedly checking said settling time when the sensor is enabled, detecting a substantially reduced settling time, and providing an input to a vehicle control system indicative of said substantially reduced settling time, so as to indicate immersion of the diaphragm of the sensor.

It will be appreciated that the settling time may be repeatedly checked whilst the device is indicating wading, and further that the method may include the step of providing an input to the vehicle control system indicative of a resumption of normal settling time, which is substantially greater in air. It will further be understood that inputs may be delayed until a pre-determined number of successive checks have indicated a substantial change in settling time.

It will be appreciated that the step of determining the normal (air) diaphragm settling time, may be performed repeatedly—for example upon turning of the vehicle ignition switch—or may be pre-determined and stored in a look-up table of a vehicle control system. Likewise the settling time in water may be similarly pre-determined and held in a look-up table. Other arrangements for storing and comparison of the sensed values are possible.

The means and methods of the invention may provide a suitably enabled parking distance control sensor or sensors, and be used in conjunction with a tilt sensor to give predictive information to the driver, and to prepare or enable vehicle systems.

According to a further aspect of the invention, a wading indicator of a vehicle comprises one or more appropriately enabled ultrasonic devices, a downwardly facing device of the same kind adapted for mounting high on a vehicle, and a control unit adapted to measure that the output of said downwardly facing device is within a prescribed range.

Such a downwardly facing device may for example be mounted on the vehicle bonnet, tailgate or boot lid at a distance above parking sensors—which are typically at vehicle bumper level—and can detect the surface of water in which the vehicle may be partly immersed. The downward facing devices(s) may be enabled only when the bumper mounted sensors indicate immersion in water, so as to avoid false positive signals, for example from an animal passing beneath the downward facing device. The downward facing device is preferably mounted above the maximum wading depth of the vehicle, so as to avoid potential immersion thereof.

It will be appreciated that once enabled, the maximum distance between the high mounted device and the water surface will be known, and accordingly the output of the high mounted device can be considered highly reliable if falling within prescribed distance limits.

The control unit may further be adapted to calculate the distance from the downwardly facing device to the surface of the water, thereby to allow the depth of water to be calculated.

It will be appreciated that the latter step requires the arithmetical step of subtracting the measured distance from the known heights of the downward facing device above ground. This height may be stored in a look-up table of a vehicle control system.

According to yet another aspect of the invention, there is provided a method of determining the depth of water in which a vehicle is partly immersed, and comprising determining that a vehicle is at wading depth by the use of one or more ultrasonic emitter/receiver devices, enabling a downwardly facing ultrasonic emitter/receiver device mounted high on the vehicle, determining that the distance sensed by said downwardly facing device is within a prescribed range, and providing an input to a vehicle control system indicative of said distance falling within said range.

Alternatively, or in addition, the method may include the steps of determining the distance sensed by said downwardly facing device, calculating the depth of water by reference to the height of said device above ground and providing an input indicative of water depth to a vehicle control system.

According to yet another aspect of the invention, there is provided a vehicle having an ultrasonic emitter/receiver device, a means of indicating when said device is immersed, and a switching device to re-calibrate the output of said device between operation in air and in water.

Such an arrangement may permit a conventional parking distance sensor to be used when immersed to detect underwater objects and the distance thereof from the sensor. It is well-known that the time of flight of an ultrasound signal is faster in water than in air, and accordingly re-calibration is required for the correct distance to be indicated.

This aspect of the invention permits underwater use of the sensor at minimal additional cost, and may be a substantial benefit in avoiding contact with underwater obstructions.

More than one parking distance sensor of a vehicle may be enabled according to this aspect, including both front and rear mounted sensors.

According to yet another aspect of the invention, a method of detecting underwater objects from a vehicle having an ultrasonic emitter/receiver device comprises detecting that said device is underwater, and recalibrating the output of said device for operation in water.

The method may further include the step of recalibrating the output of the device for operation in air when the device re-surfaces.

Calibrations may be held in a control unit of the vehicle, for example in a look-up table.

In an optional embodiment, the PDC ultrasound transducer may itself provide an indicator the sensor is immersed, using for example the means and methods already described. A downward facing device may provide the means of indicating immersion, by suitable water depth calculation.

Confidence in correct detection of partial immersion can be increased by reference to other vehicle systems, in particular electronic sensors indicative of vehicle attitude and movement.

Thus, for example, electronic inputs from vehicle sensors indicative of pitch and roll, such as downward firing sensors at the vehicle corners, may be combined and/or compared with signals indicative of partial vehicle immersion so as to gain increased confidence of signal accuracy, and to further modify vehicle response.

It will be understood that the dynamic response of a vehicle in water may be quite different from the dynamic response in air. Roll and pitch characteristics will significantly change due to the additional damping effect of water.

According to another aspect of the invention, there is provided a vehicle having a movement sensor indicative of one of roll and pitch of the vehicle body, a wading sensor indicative of the vehicle being in one of air and at wading depth in water, and a comparator to indicate whether vehicle body movement is within a range associated with the output of said wading sensor.

This arrangement allows confirmation that vehicle movement (roll, pitch or a combination of both) is within a predetermined band, which may be contained with a look-up table of a vehicle control system. In the event that outputs from the sensors cannot be correlated, a warning may be indicated to the driver, or other vehicle actions may be automatically initiated.

In a development of this aspect, the vehicle may further include a sensor indicative of wading depth, and the comparator may select a permissible range according to the sensed wading depth.

In yet a further development, the vehicle may include a means of adjusting roll and/or pitch, and a controller thereof, said controller adjusting the response of the vehicle body according to the output of the wading sensor and/or the depth of water sensed. Such an arrangement may improve comfort and safety of persons with in the vehicle when wading, and improve vehicle traction.

Ultrasonic emitter receiver devices, such as parking distance control sensors, as described above, can provide a suitable indicator of wading and wading depth. Other acoustic (sonic) transducers can also be used.

In yet another aspect of the present invention there is provided a method of determining whether movement of a vehicle body is within a prescribed range, and comprising the steps of sensing whether the vehicle is in air or is wading, sensing body movement by detecting one of roll and pitch, comparing body movement with a range associated with movement in air and at wading depth, and indicating whether or not body movement is appropriate.

Movement in roll and pitch may be sensed to give an appropriate vector, and associated ranges may be provided for comparison.

The method may include the step of sensing wading depth above a minimum, and determining whether body movement is within a range associated with the sensed depth.

In yet another aspect, the invention provides a vehicle having an attitude sensor indicative of a vehicle body angle with respect to a horizontal plane, a wading sensor indicative of the vehicle being in one of air and at wading depth in water, and a comparator to indicate whether vehicle attitude is within a range associated with the output of said wading sensor.

Such a comparator may be used to confirm that the vehicle is at a safe attitude when wading, the permissible range of attitudes being for example much less than when on dry land. The attitude sensor may comprise a mathematical combination of the outputs of two or more individual sensors, for example fore and aft, and side to side tilt sensors.

A sensor indicative of wading depth may be included, the permissible range of attitudes being different according to the detected wading depth.

Detected wading depth may be an average of depths detected around the vehicle, or may be the maximum detected depth.

The permissible range(s) may be determined in advance, and retained in a look-up table of a vehicle control system.

In yet another aspect, the invention provides a method of determining whether attitude of a vehicle body is within a prescribed range, and comprising the steps of sensing vehicle attitude, sensing whether the vehicle is in air or is wading, comparing vehicle attitude with a range associated with permissible attitude in air and at wading depth, and indicating whether vehicle attitude is appropriate.

The method may further include the step of sensing wading depth above a minimum, and determining whether vehicle attitude is within a range associated with the sensed depth.

An ultrasound emitter/receiver device such as a parking distance control sensor or sensors, as described above are preferably used as sensors of wading and wading depth. Conventional vehicle devices such as low-g accelerometers and gyroscopes can be adapted to give information about instant vehicle attitude, for example fore and aft tilt, and side to side lean.

Various aspects of the present invention relate to ultrasonic devices, vehicles and methods of use. It will however be appreciated that the inventions may be retrofitted to existing vehicles as a combination of hardware and software. Such means may adapt an existing vehicle with parking sensors to detection of wading or wading depth. In this specification use of the term 'wading depth' indicates wading at a depth sufficient to be detected by appropriately mounted parking sensors, but does not indicate any particular depth, nor that any vehicle with parking sensors can be adapted to wade merely by adaptation of the sensor controller. As is well understood, many aspects of a vehicle may require modification to ensure successful wading, but the disclosed devices and methods provide a convenient and economical way of establishing wading and the depth of wading.

Within the scope of this application it is envisaged that the various aspects, embodiments, examples, features and alternatives set out in the preceding paragraphs, in the claims and/or in the following description and drawings may be taken independently or in any combination thereof. For example, features described with reference to one embodiment are applicable to all embodiments unless there is incompatibility of features.

Reference in this specification to 'control unit' includes reference to any suitable controller for interpreting, translating and acting upon signals of a sensor. In addition, reference to vehicle control systems, controllers and control units is intended to include any suitable electronic vehicle system or systems, typically including memory and processor functions. The control unit may comprise a distributed system and/or may be incorporated within a vehicle control system. Signals may be analogue or digital.

BRIEF DESCRIPTION OF THE DRAWINGS

Embodiments of the invention will now be described, by way of example only, with reference to the accompanying drawings in which.

DETAILED DESCRIPTION OF EMBODIMENTS

Detailed descriptions of specific embodiments of the apparatus, system, vehicle, program and method of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the apparatus, system, vehicle, program and method described herein may be embodied in various and alternative forms. The figures are not necessarily to scale and some features may be exaggerated or minimized to show details of particular components. Well-known components, materials or methods are not necessarily described in great detail in order to avoid obscuring the present disclosure. For example, the program executed by the control unit can be implemented as a non-transient computer readable memory on which the program is stored, including such things as magnetic media, optical media, or any suitable type of RAM or ROM, as is known in the art. Any specific structural and functional details disclosed herein are not to be interpreted as limiting, but merely as a basis for the claims and as a representative basis for teaching one skilled in the art to variously employ the invention.

Figure 1A:
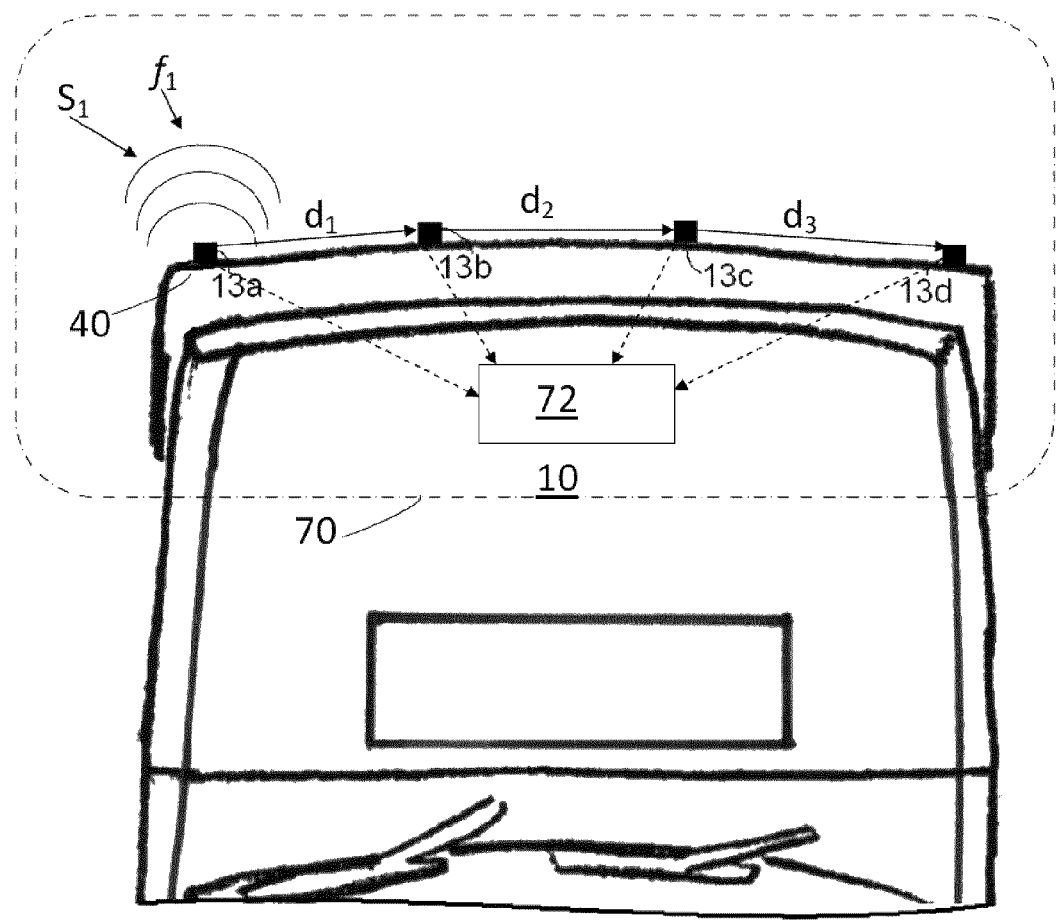
FIG. 1A is a schematic illustration of a system for a vehicle for detecting the presence of water (or other liquid) at a wading depth about at least a portion of the vehicle.
Figure 1B:
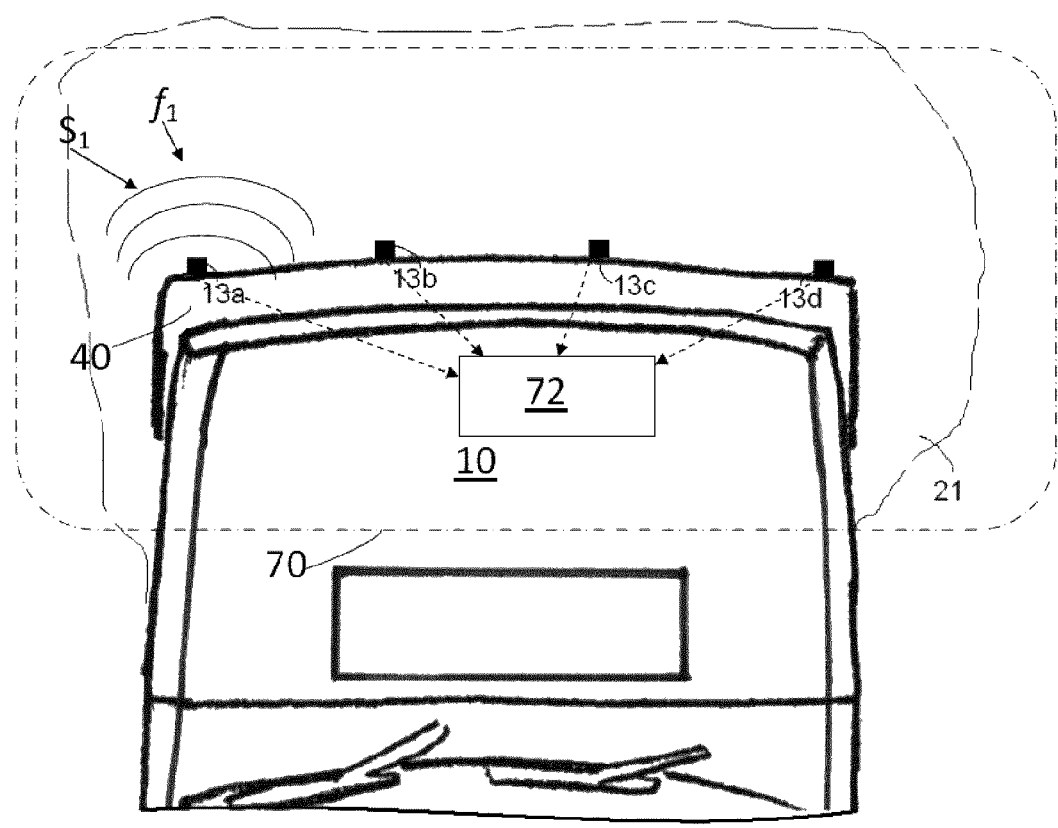
FIG. 1B is an illustration of the vehicle of FIG. 1A wherein the vehicle is partially immersed in liquid, for example water.

Referring to FIG. 1A, a vehicle 10 is illustrated having a system 70 for indicating or determining whether at least a portion of the vehicle 10 is disposed in a liquid such as water 21. The system 70 comprises a processing unit 72 and one or more sensors 13a, 13b, 13c, 13d. Optionally, the sensors 13a, 13b, 13c, 13d are transducers, configured to both emit and receive ultrasonic or other sonic pulses. In FIG. 1B, the vehicle and system 70 are illustrated again; the vehicle 10 is at least partially immersed in water. The one or more sensors 13a, 13b, 13c, 13d are immersed in water.

The processing unit 72 is configured to at least receive electrical signals issued by the one or more sensors 13a, 13b, 13c, 13d and process those signals to make a determination about the environment of the vehicle 10. Optionally, the system 70 is in continuous use when the vehicle is operational so that the vehicle 10 environment is being continuously monitored. Alternatively, the system 70 may be intermittently operated and may only intermittently, albeit frequently, monitor the environment of the vehicle 10.

The processing unit or control unit 72 may additionally be configured to issue electrical signals to the one or more sensors 13a, 13b, 13c, 13d to control them. Optionally the system 70 may comprise eight sensors positioned four on the front bumper 40 and four on the rear bumper (not shown). The sensors may optionally include transducers (emitters and receivers) 13a, 13b, 13c, 13d, that may preferably, but nevertheless optionally, be ultrasonic transducers. A series of four sensors 13a, 13b, 13c, 13d is illustrated in FIG. 1A disposed in a linear configuration extending across the width of the front bumper 40. A further set of four sensors (not shown) may be similarly arranged on the rear bumper of the vehicle 10.

It will be understood that a greater or fewer number than four sensors may be used in other embodiments. Optionally at least one sensor may be provided. The arrangement of the sensors 13a, 13b, 13c, 13d is optional and a roughly linear configuration is shown merely for illustration purposes. In other embodiments, the sensors 13a, 13b, 13c, 13d may be arranged in a non-linear configuration and/or may be positioned at more than one height across the vehicle 10; and/or may be disguised or occluded from normal view for stylistic and/or other purposes.

Furthermore, whereas the present embodiment is described as utilising ultrasonic transducers it will be understood from reading the foregoing that other suitable types of sensor or transducer may be used in alternative envisaged embodiments.

The terms ultrasound and ultrasonic are used synonymously in the foregoing to mean sound waves of a frequency that is outside of the typical human-hearing range, optionally taken to be greater than about 20 kHz. It will be understood that the present invention may be effectively employed using sonic sensors that emit and receive sound waves at frequencies lower than 20 kHz.

Ultrasonic sensors such as those currently used for parking distance control typically comprise a diaphragm that can oscillate or vibrate that is disposed to face out from a vehicle bumper 40; a piezoelectric element positioned behind the diaphragm; and an integrated circuit. The same diaphragm may be used to emit an ultrasonic signal (in the form of sound waves) and receive an ultrasonic signal. The emission and reception of ultrasonic signals, waves or pulses is typically controlled by the integrated circuit, which may optionally issue electrical signals to an electronic control unit 72 for processing. The settling time of the diaphragm in water may be between about a third and about a quarter of the settling time of the same diaphragm driven by the same electrical signal in air. The behaviour of the diaphragm in water is quite different because of, inter alia, the density of water and the damping effect it has on the oscillating diaphragm.

The one or more sensors 13a, 13b, 13c, 13d are optionally each ultrasonic transmitters/receivers. As such an optional but nevertheless beneficial aspect of this embodiment of the invention is that ultrasonic sensors that may currently be installed on vehicles to operate as parking distance control sensors (PDCs) can additionally be utilised in application of the present invention without the need to install additional devices on a vehicle.

Figure 1C:
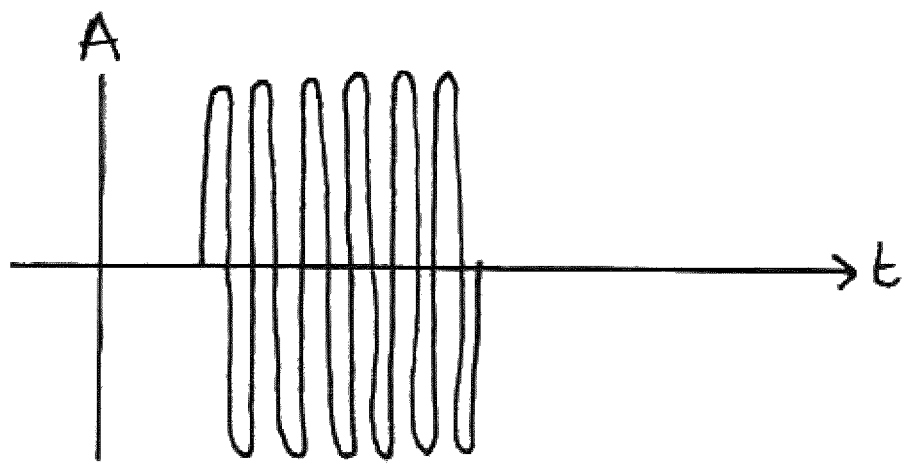
FIG. 1C is a schematic illustration of an electrical input signal that may be used to drive a sensor used in the system of FIGS. 1A and 1B to oscillate a diaphragm of that sensor.
Figure 1D:
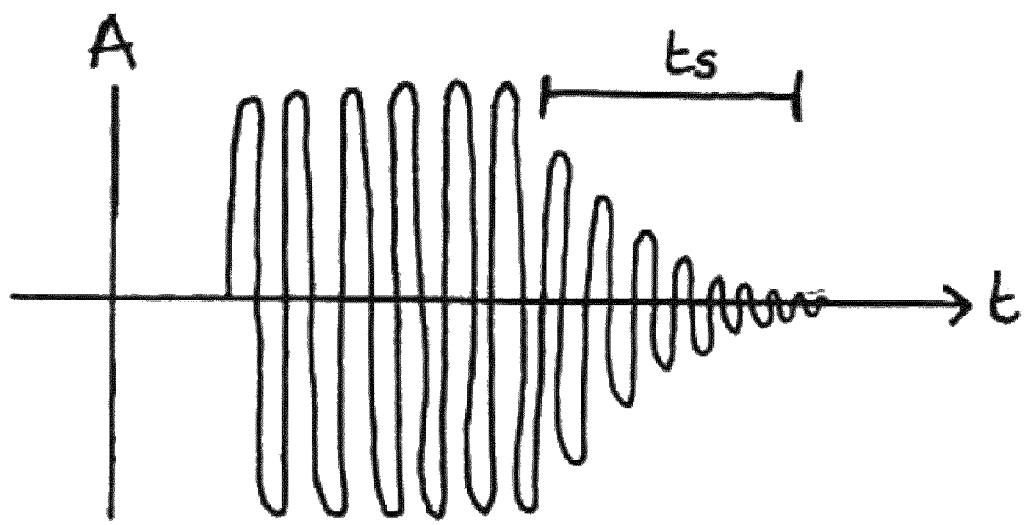
FIG. 1D is a schematic illustration of an electrical signal generated by the vibrating diaphragm of the sensor driven by the electrical input signal of FIG. 10 when the sensor is disposed in air. A settling time of the diaphragm in air is illustrated. Settling time ($t_s$) is the time taken for the oscillation of the diaphragm to reduce in amplitude and energy to a predetermined threshold.
Figure 1E:
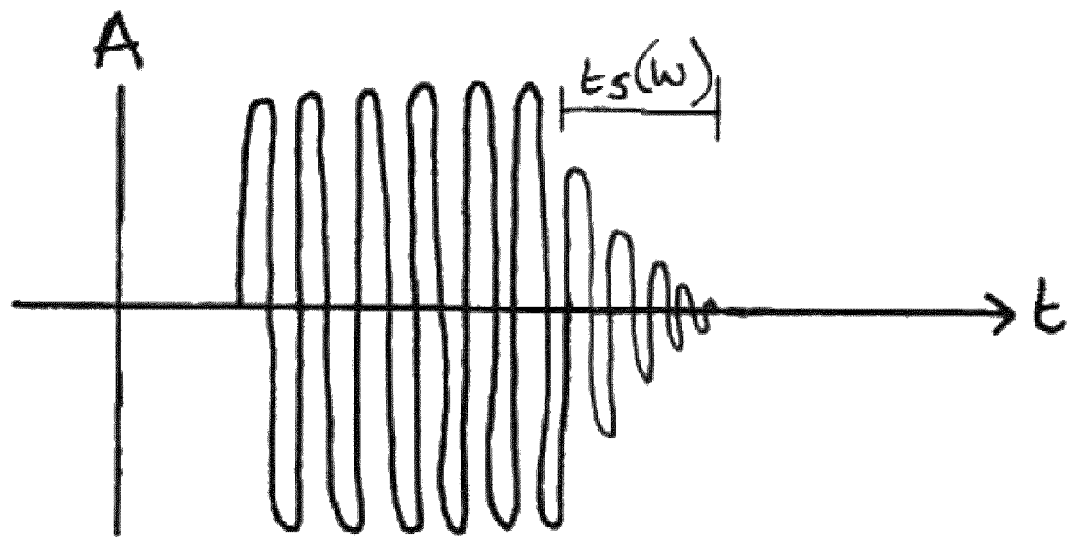
FIG. 1E is a schematic illustration of an electrical signal generated by the vibrating diaphragm of the sensor driven by the electrical input signal of FIG. 10 when the sensor is disposed in water.

In FIG. 1C an oscillating electrical control signal is illustrated. The oscillating signal may be sinusoidal or may be any other electric signal suitable to generate an oscillating vibration of a diaphragm of the sensor 13a. FIGS. 1D and 1E show schematically the electrical signals output by electrodes disposed across the sensor 13a. FIG. 1D depicts the response of the sensor to the drive signal when the sensor is disposed in air and FIG. 1E depicts the response when the sensor is disposed in water. It can be seen that the response signal mimics the drive signal but continues after the drive signal has stopped during a decay period wherein the oscillation of the diaphragm fades. A threshold for defining a settling time may be when the response signal has decayed to between about 0.5% and about 20% of the maximum amplitude. As soon as the response signal reaches the threshold amplitude, the settling time has ended. A starting time for the settling time optionally may be defined as the same time as the drive signal stops. The time period from the termination of the drive signal to the response signal having decayed to a threshold amplitude value may therefore be used as a repeatable definition of settling time.

The system 70 utilises the measurable difference between the settling time $t_s$ (air) of a diaphragm when oscillating in air and the settling time $t_s$ (water) of the same diaphragm when oscillating in water, (the latter being significantly faster) to determine whether a sensor 13a and a vehicle 10 upon which the sensor 13a may be mounted is immersed in air or water. Optionally, a diaphragm may be intermittently driven by an oscillating electrical signal and a time interval between successive activations, or signal pulses driving the oscillations, may be selected to be greater than the settling time of the diaphragm. Accordingly the control unit can provide an input to a vehicle data bus or vehicle CAN indicative of such a device being underwater. The sensors will optionally be mounted on a vehicle at bumper height, which is a suitable height for detecting wading.

Optionally, the settling time of a suitable ultrasonic transducer operable at a frequency of about 51 kH may be about 100 µs in water and about 400 µs in air.

Optionally, the control unit 72 of the system 70 may be configured to expect a certain settling time in air $t_s$ (air) and a significant deviation from the expected settling time can be used to determine that the sensor is not in air. For example an algorithm executed by the processing unit 72 of the system 70 may be configured to make a reasonable determination of the presence of water based on the following logic:

Is measured settling time within allowable tolerance of expected $t_s$ (air)?
If yes then vehicle is in air, if no then vehicle is in water.

Alternatively, or additionally, an algorithm executed by the processing unit 72 may recall stored expected values of the $t_s$ (air) and $t_s$ (water) and perform the further following logic:

If measured settling time is not within accepted tolerance for air, is measured settling time within accepted tolerance for $t_s$ (water)?
If yes, then vehicle is in water, if no, then further monitoring is required before determination is made.

It will be understood from reading the foregoing that the system 70 may utilise different sequences of logic steps in an algorithm and/or a variety of statistical comparison techniques to decide whether the measured settling time means that the sensor or transducer is disposed in air or in water.

Figure 2A:
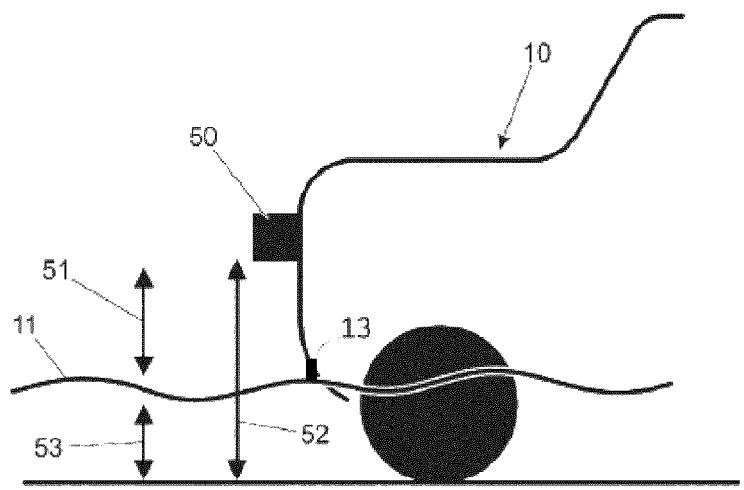
FIG. 2A is a schematic illustration of a vehicle having a system for indicating that a vehicle is in a wading situation and for estimating wading depth, optionally using a substantially downward facing ultrasonic transmitter and receiver.
Figure 2B:
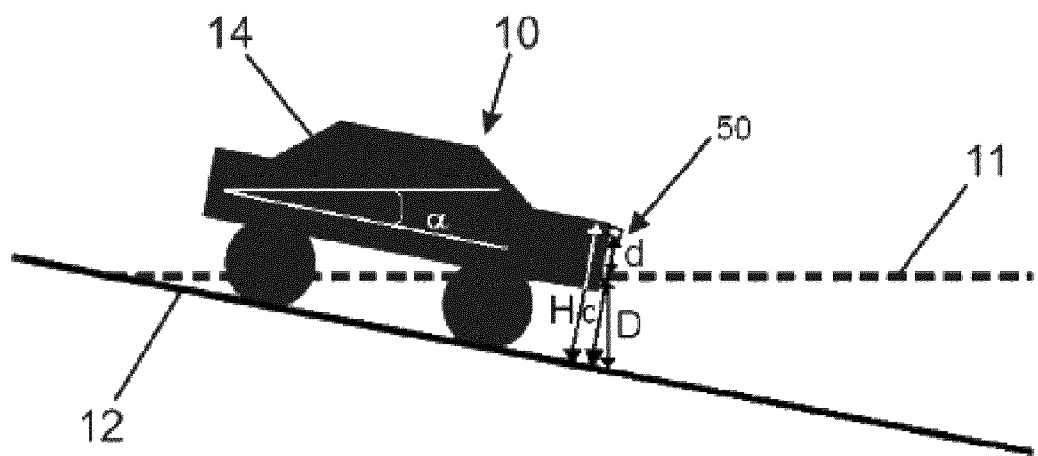
FIGS. 2B and 7 are a schematic illustrations of a vehicle having a system for estimating the depth of water in which the vehicle is positioned, using information about the attitude or inclination of the vehicle and utilising a substantially downward facing sensor.

FIG. 2b illustrates a vehicle 10 entering water having a surface 11 and on an inclined slope 12. Optionally, an ultrasonic parking distance sensor 13 on the front bumper exhibits a change in response when entering water, and thus is an indicator of wading (as described above).

The sensor 13 includes a vibrating diaphragm which is pulsed at intervals. The settling time of the diaphragm can be measured in a control system of the vehicle. This settling time is substantially shorter in water than in air, and immersion of the sensor can thus be detected by reference to the air settling time.

Pulsing of the sensor 13 is optionally provided at time intervals greater than the settling time in air. Where several sensors are provided, pulsing may be alternate or in sequence so as to allow settling times to overlap.

The sensor may also be used for parking distance control, or may be independent and hidden from view. For example an immersion sensor may be placed within the front bumper structure.

FIGS. 2A and 2B illustrate a vehicle 10 having a system for estimating the depth of water in which the vehicle 10 is wading. The system for wading estimation may optionally comprise a substantially downward facing sensor 50 that may optionally comprise a signal emitter and a signal receiver (optionally for example a transducer). The system also comprises a control unit (not shown) configured to monitor electrical signals transmitted and received by the one or more sensors 50. Further optionally the sensor 50 may be an ultrasonic transducer capable of emitting and receiving pulses of ultrasound.

The control unit may be configured to at least receive electrical signals issued by the sensor 50 and process them. The control unit may additionally be configured to issue electrical signals to the sensor 50 to control it. Optionally the system may comprise more than one sensor 50. The sensor 50 may optionally be or include transducers (that can optionally convert acoustic signals to electrical signals and vice versa) that may preferably, but nevertheless optionally, be ultrasonic transducers. A single sensor 50 may be provided on the front of the vehicle 10 and a single sensor 50 may be provided on the rear of the vehicle 10. Whereas it is advantageous to position the sensor 50 at a leading edge of the vehicle 10 in order to obtain an earliest measurement of wading depth, it is also envisaged that in other embodiments of the invention the system may comprise one or more sensors positioned inward of a leading edge of a vehicle, for example on a lowermost surface of each of the wing mirrors of the vehicle 10.

Whereas the system is suitably arranged with only one substantially downward facing sensor 50, it will be understood that a greater number of sensors 50 may be used in other embodiments. Optionally two sensors may be provided. The arrangement of the one or more sensors 50 may be used to provide additional information about topography of the surface upon which the vehicle 10 is driving. In other embodiments, the one or more sensors 50 may be arranged in a non-linear configuration and/or may be positioned at more than one height about the vehicle 10; and/or may be disguised or occluded from normal view for stylistic and/or other purposes. In use, the one or more sensors 50 are preferably downward facing, but may be moveable from a stowed position into a use position where they are substantially downward facing.

Furthermore, whereas the present embodiment is described as utilising ultrasonic transducer 50 it will be understood from reading the foregoing that other suitable types of sensor or transducer may be used in alternative envisaged embodiments. For example, other ranges of acoustic transducer sensor such as an audible sound wave transducer may be used. It will be understood that other types of sensor may be suitable in replacement of or in conjunction with an ultrasonic sensor, for example, other acoustic, but non-ultrasonic sensors, an electromagnetic sensor optionally utilising an LED for emission of an infra-red signal and a photodiode for receiving a portion of the infra-red signal reflected from a surface.

In normal use as a parking sensor, the timing difference between the transmission of an ultrasonic pulse and receipt of a reflection of that same ultrasonic pulse can be used to measure the range or distance between the vehicle and an object in the vehicle path.

FIG. 2A illustrates schematically the vehicle 10 having a bonnet or front grille mounted downward facing ultrasonic transducer sensor 50, such as those used as parking distance control sensors. The sensor 50 in FIG. 2A is configured to emit a signal or pulse of ultrasound and detect an echo of that signal. The echo is a reflection of the signal from a nearby surface and the time of flight of the signal to the surface and back can be used to calculate a distance d, 51 between the sensor 50 and the surface 11, which may be the surface of water 11 in which the vehicle 10 is wading.

The mounting height or in-use position H, 52 of the sensor 50 is a known parameter and may be stored in a memory associated with the control unit of the system. The control unit, knowing the mounting height or in-use height 52, H of the sensor 50 and the distance d between that sensor and a surface 11 (optionally determined by dividing the time taken by a signal to be returned to the sensor 50 by two and multiplying it by the speed of that signal in air) the depth of water 53, D can be calculated as follows:

$$D = H - d$$

A look-up table may give a mounting height or in-use height H, 52 associated with a vehicle suspension height setting (referred to as a ride height). A test mode may be provided for calibrating the mounting height on dry land, notwithstanding that the sensor 50 optionally may only be enabled whilst the vehicle is in a wading situation. Optionally, the control unit may determine, in real-time, the in-use position H of the sensor 50 by adjusting, a normal value H of the mounted height, by a correction for the ride height r of the vehicle.

Figure 3A:
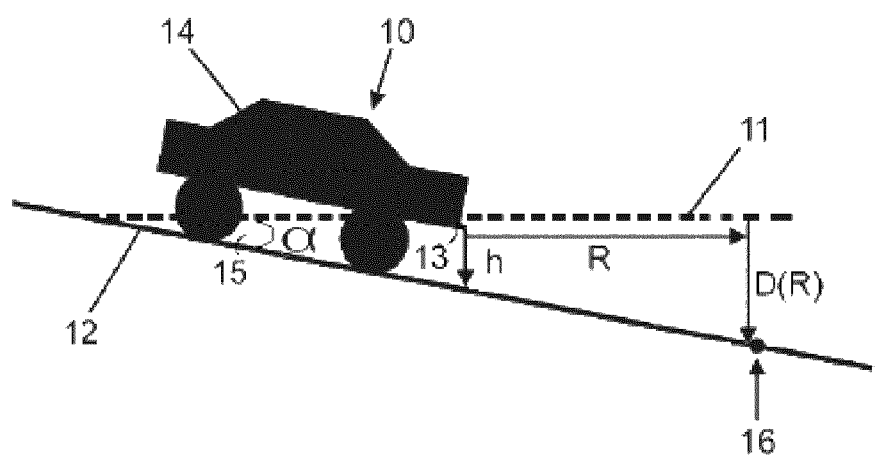
FIG. 3A is a schematic illustration of a vehicle having a system for indicating that a vehicle is in a wading situation and for estimating the depth of water ahead of the vehicle using information about the attitude or inclination of the vehicle.
Figure 6:
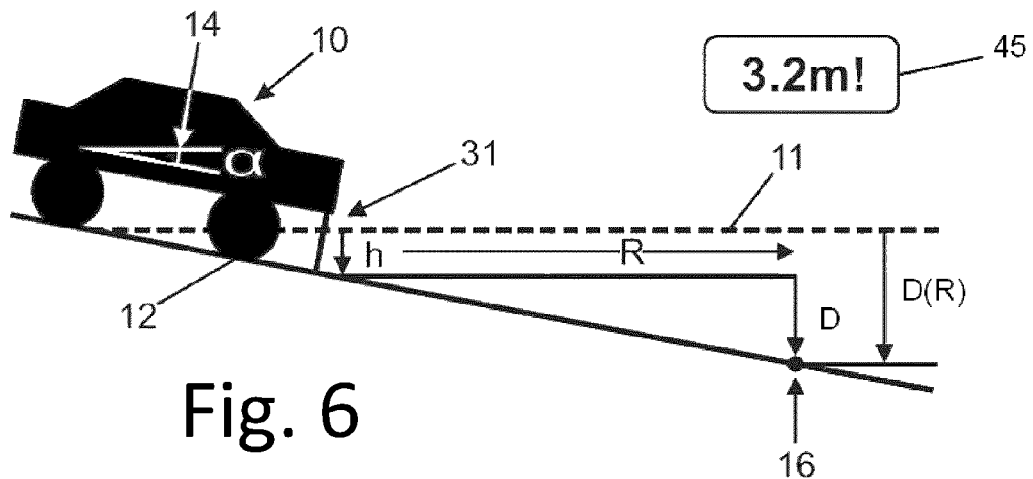
FIG. 6 further illustrates a system comprising a sensor for use in estimating a maximum distance that the vehicle may be able to travel based upon a maximum wading depth of the vehicle.
Figure 7:
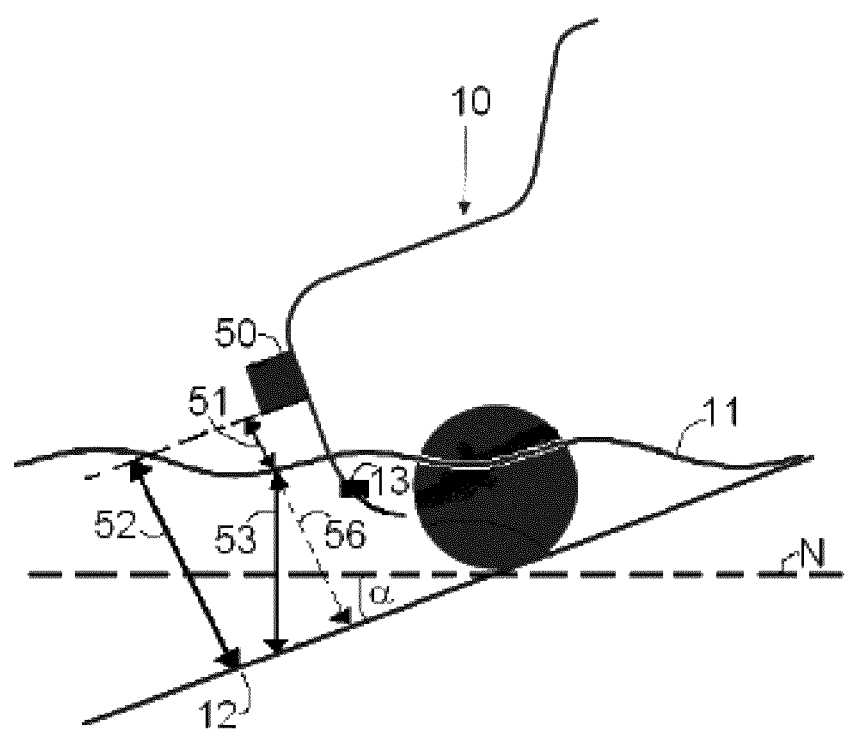

In FIGS. 3A, 6 and 7 a wading event indicator sensor 13 is disposed on the vehicle 10 at a location of height, h, which is preferably, but nevertheless optionally at a lower height than the height H of the substantially downward facing sensor 50. It is desirable for the wading event indicator sensor 13 to be mounted as low as possible so that an earlier indication of the presence of water in the path of the vehicle 10 can be given. According to an optional aspect, the wading event indicator sensor 13 may be an ultrasonic sensor, optionally disposed on the front bumper and may exhibit a change in response (as described in co-pending applications that are incorporated herein by a reference provided at the end of the description) when entering water, and thus may provide an indication of the vehicle being in a wading situation.

In FIGS. 3A, 6 and 7 illustrate a vehicle 10 on an inclined surface 12 and entering water having a surface 11. The system 70 may comprise or utilise one or more tilt sensors 14 provided on the vehicle 10 which may be used by the control unit of the system to at least approximate an indication of fore and aft inclination α, 15. As illustrated in FIG. 2, the system 70 may be configured to approximate the depth of liquid in which the vehicle 10 is wading, again by using the distance d (as determined by the sensor 50 and system 70) between that sensor 50 and the surface 11; the known height H of the sensor 50 in use; the angle α of inclination and optionally the following relationship:

$$D = \frac{(H-d)}{\cos(\alpha)},$$

FIG. 7 illustrates a vehicle 10, not level, but on an incline 12. Information, optionally from a fore and aft tilt sensor 14 may provides vehicle inclination, and thus a correction factor 56 for the water depth calculation. Correction factor 56 is equivalent to H-d and can be used in the equation above in replacement of the terms H-d. It will be understood that the format of an algorithm used to carry out the computations required may be varied to accommodate various programming languages and other requirements; as such the implementation of various aspects of the invention may be done in many and various ways.

Figure 3B:
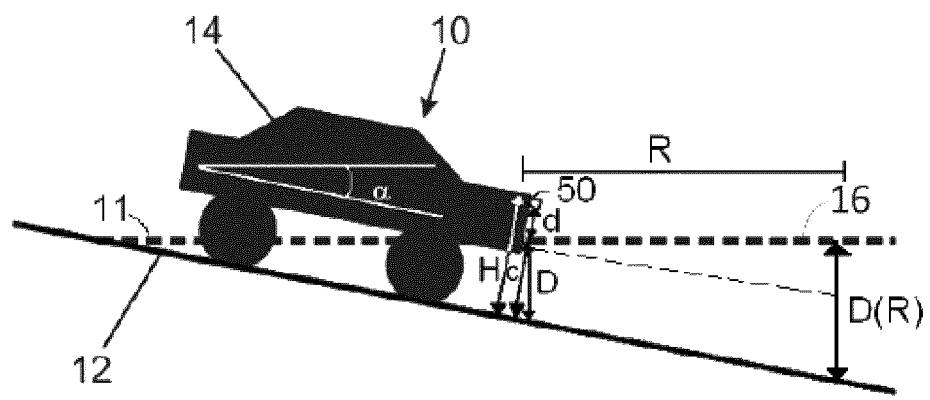
FIG. 3B is a schematic illustration of a vehicle having a system for estimating predictive vehicle wading depth optionally using a substantially downward facing ultrasonic transmitter and receiver.

Referring further to FIGS. 3A and 3B, it is illustrated how a system 70 installed on the vehicle 10 is configured to and can be used to predict water depth at a substantially linear distance R ahead of the vehicle 10. The calculation, prediction or estimation of depth ahead of the vehicle 10 may be carried out immediately upon the system 70 realising (by use of the wading event indication sensor 13) that the vehicle 10 is in water. As such an early prediction of ahead depth D(R) may be made using the height h of the wading event indication sensor 13 as an estimation of the current water depth and the following equation:

$$D(R) = R \cdot \operatorname{Tan}(\alpha) + h$$

Wherein, h is the mounting height or in-use height of a wading indicator sensor. It will be appreciated that the value of h may be fixed in relation to actual sensor height above ground in the horizontal vehicle condition, or according to a vehicle suspension height setting. A more accurate calculation of h may take into account vehicle inclination α so as to give the true vertical dimension when the vehicle is inclined.

Further optionally, and with reference to FIG. 3B, the following equation may be used to calculate a depth of water (or other liquid such as muddy water) D(R), at a distance R ahead of the current vehicle 10 position using a more accurate estimation of the depth of water D that the vehicle 10 is currently in (as calculated above for example, see FIGS. 2, 5 and 7):

$$D(R) = R \cdot \operatorname{Tan}(\alpha) + D$$

Where D(R) is the estimated depth; R is the distance to the point of estimation 16, which may for example be 1 metre; $\alpha$ is the angle of inclination; and D is the depth of water that the vehicle 10 is already in. D may be calculated as described above.

Whereas, in an optional embodiment of the system 70, the prediction assumes that the angle of inclination $\alpha$ is constant, the prediction may be updated in real-time using a real-time signal feed of measured inclination angle $\alpha$. A change in vehicle fore and aft inclination may also be detected by continual or intermittent sampling of outputs of a vehicle tilt sensor, so that the control unit may be configured to give predictive information of a likely change in slope, and thus whether the slope is increasing or decreasing.

Figure 4:
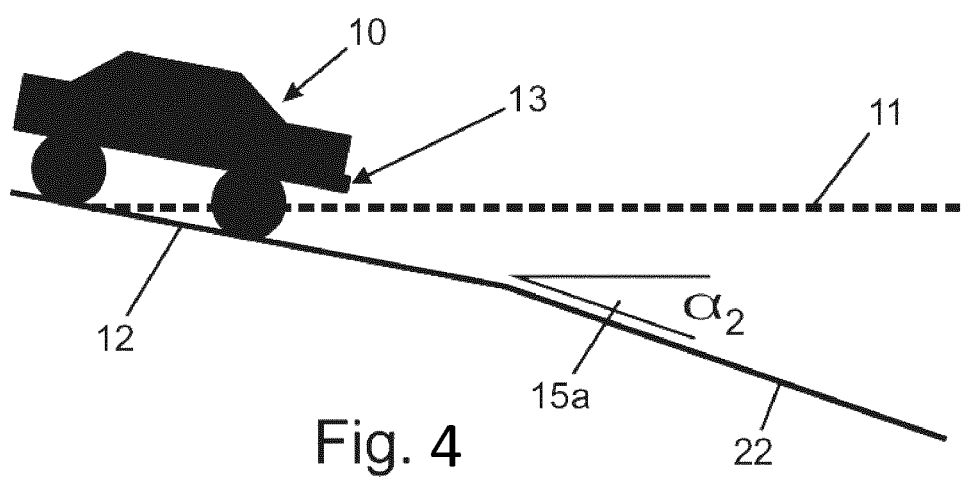
FIG. 4 illustrates the vehicle and system of FIG. 3 in a situation where there is a variation of the slope of inclination of the ground surface upon which the vehicle is travelling.

FIG. 4 illustrates an embodiment where the angle of inclination 15a increases in the forward path of the vehicle to give an increased slope 22. The control system 72 of the vehicle 10 may monitor a change in angle of inclination $\alpha$ so as to indicate increasing slope. By the system 70 repeatedly conducting a prediction of the ahead range of the vehicle (either recalculating when $\alpha$ changes, or intermittently recalculating when $\alpha$ is measured) more accurate estimation of the point at which the vehicle may reach a maximum wading depth can be made.

Figure 5:
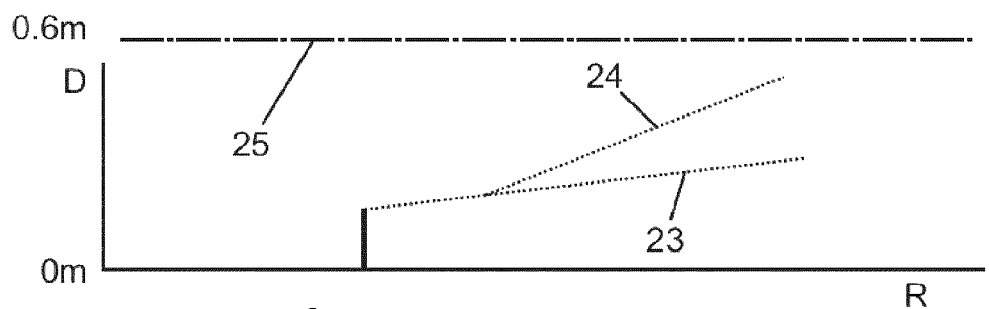
FIG. 5 illustrates graphically the change in slope illustrated in FIG. 4.

FIG. 5 illustrates graphically a path estimation of the vehicle 10 according to successive increasing angles of inclination 23, 24 and a maximum wading depth 25 of 0.6 m.

FIG. 6 illustrates a vehicle having a device 31 (shown schematically) for measuring depth of water. Any suitable device may be used; in particular a bonnet mounted downward facing ultrasonic sensor.

Continual measurement of actual immersion depth D may be made and compared with a maximum wading depth $D_{max}$ of the vehicle 10. Depth estimation ahead of the vehicle 10 may be carried out for single distance R ahead of the vehicle, for example 1 m, or at a number of discrete points, for example 50 points at 100 mm intervals.

Alternatively, or additionally, the system 70 may be configured to estimate a distance $R_{max}$ ahead of the vehicle at which it is estimated the maximum wading depth, $D_{max}$ may be reached. This may be calculated by:

$$\frac{D_{max} - D}{\operatorname{Tan}(\alpha)} = R_{max}$$

Wherein $\alpha$ is the current angle of slope inclination and D is the current wading depth.

The distance to maximum wading depth may be presented to the driver in the form of a dashboard warning 45, in analogue or digital form.

Information, data or signals from any of the sensors, 13, 14, 50 concerning water presence, water depth and tilt angle may be transmitted to a control unit or processor of the system 70 by a vehicle Bus system and/or via a vehicle controller area network (CAN).

The system 70 may be provided with a water surface sensor 50 and/or one or more water indication sensors 13 on the rear of the vehicle 10 and as such the afore described detection of wading; estimation of current wading depth and prediction of ahead wading depth may equally to forwards and reverse vehicle 10 movement, optionally using sensors at the leading edge of the vehicle.

A downward facing ultrasonic sensor 50 may be provided at the front of the vehicle, for example centrally in the radiator grill or on the bonnet, or at the side (for example on a lower surface of the wing mirrors) optionally provided that it has an output cone projecting beyond the vehicle front or rear wheels. Thus a sensor may be provided at the side and/or within the external body panels so long as a clear forward and downward line of sight is maintained. The height H, 52 of the depth measurement sensor 50 may be determined by vehicle body design and the maximum wading depth for which the sensor is intended to be operable.

It is envisaged that in other embodiments, the system 70 may comprise one or more sensors 50 that are angled non-perpendicularly toward a water surface 11, where this is the case, the algorithm executed by a processing unit of the system 70 may incorporate a further step to improve the accuracy of the value of d (the distance between the sensor 50 and the water surface 11) determined from the time of flight measured.

In the foregoing the term downwardly has been used to describe an optional position or orientation of the sensor 50. It will be understood that downwardly may mean perfectly normal, substantially normal, within about 0 to about 20° off normal.

The wading depth sensor may be activated automatically, or on demand by the driver. A driver override may be provided. The system of wading and/or depth sensing may be operational only below a pre-determined wading speed, and the vehicle speed may be limited to a pre-set maximum during wading.

It will be understood from the foregoing that the system 70 and its control unit may estimate, approximate or predict a depth of water in which the vehicle is wading or may wads in a number of ways. Exemplary calculations have been described, however, it is envisaged that many and various other ways for approximating or determining current or ahead wading depth will be suitable for use by a system 70 according to the invention. For example, any of the trigonometric functions mentioned in the above equations may be approximated by a fixed value or a series expansion may be computed to determine the value (such as a Taylor or Euler Series Expansion); further optionally, predefined values for each or any suitable term in the above described relationships may be listed in a look-up table (if appropriate) to be referenced during the computation of an estimation of wading depth. Additionally, or alternatively, or in combination, any of the trigonometric functions may be substituted in order to simplify the computation (and thereby optionally reduce the processing time needed in order to compute the compensation). It is envisaged that any of the trigonometric functions listed in the above equations may be computed by using an expansion series such as a Taylor Expansion Series or if appropriate an Euler Expansion Series and/or predetermined and listed in a reference or look-up table. The values, if provided in a look-up table may be linearly interpolated, quadratically interpolated, exponentially interpolated or interpolated using any other suitable mathematical method that would provide a suitable approximate value for the trigonometric function being interpolated.

Furthermore it will be understood that the order in which certain terms are computed may be adjusted to other embodiments of the invention and that a combination of calculation and/or referencing and/or approximation may be used for any or all of the relationships adapted to improve the accuracy of the detected variable.

Additionally it will be understood that other suitable devices may be utilised by a system 70 according to the invention to measure the depth D of water in which a vehicle 10 may be wading. As such the use of a downward facing sensor 50 is entirely optional. Other optional depth measurement devices that may be suitable for use in the system may be used and the depth measurement provided by one or more of them used in a computation of the distance at which maximum wading depth is likely to be reached or in the computation of the depth D(R) at a distance R ahead of the vehicle.

In the foregoing the term ahead has been used to refer to the path in front of the vehicle in its direction of travel. It will be understood that this may not be limited to exactly parallel with the line of travel of the vehicle.

The present application claims priority to UK patent application numbers filed by the present applicant on 15 Dec. 2010 having the application numbers GB1021268.6, GB1021278.5, GB1021272.8, GB1021297.5, GB1021295.9 and GB1027296.7, the contents of each of which are expressly incorporated by reference in their entirety.

The present application is related to the PCT applications, filed concurrently with the present application, and naming at least one inventor in common with the present application, which are listed below:
1. PCT application No. PCT/EP2011/072999 to Thuy-Yung TRAN and Edward HOARE, filed 15 Dec. 2011, entitled "Wading Detection System For A Vehicle" ;
2. PCT application No. PCT/EP2011/072986 to Thuy-Yung TRAN, Edward HOARE and Nigel CLARKE, filed 15 Dec. 2011, entitled "Vehicle Control System" ;
3. PCT application No. PCT/EP2011/072997 to Thuy-Yung TRAN, Edward HOARE and Nigel CLARKE, filed 15 Dec. 2011, entitled "Wading Depth Estimation For A Vehicle";
4. PCT application No. PCT/EP2011/072988 to "Thuy-Yung TRAN, Edward HOARE and Nigel CLARKE", filed 15 Dec. 2011, entitled "Wading Vehicle Depth Measurement Apparatus";
5. PCT application No. PCT/EP2011/072990 to Thuy-Yung TRAN, Edward HOARE and Nigel CLARKE, filed 15 Dec. 2011, entitled "Vehicle Orientation Device and Method";
6. PCT application No. PCT/EP2011/072991 to Thuy-Yung TRAN, Edward HOARE and Nigel CLARKE, filed 15 Dec. 2011, entitled "Wading Vehicle Depth Measurement Apparatus";
7. PCT application No. PCT/EP2011/072992 to Thuy-Yung TRAN, Edward HOARE, Anthony JONES, Simon THOMSON and Ashutosh TOMAR , filed 15 Dec. 2011, entitled "Wading Vehicle Water Level Display";
8. PCT application No. PCT/EP2011/072994 to Thuy-Yung TRAN, Edward HOARE, Anthony JONES, Simon THOMSON and Ashutosh TOMAR, filed 15 Dec. 2011, entitled "Wading Vehicle Water Level Display";
9. PCT application No. PCT/EP2011/072996 to Thuy-Yung TRAN, Edward HOARE, Anthony JONES, Simon THOMSON and Ashutosh TOMAR, filed 15 Dec. 2011, entitled "Wading Vehicle Advisory Speed Display".

The contents of the above referenced PCT applications (and corresponding UK applications, filed concurrently and having the same ownership, inventorship and Title as the above listed PCT applications) are hereby expressly incorporated by reference in their entirety into the present application.

The invention claimed is:

1. A system for indicating wading of a vehicle comprising an acoustic emitter/receiver sensor having a diaphragm which vibrates in use in response to a drive signal, and a control unit configured to measure the settling time of the diaphragm in a decay period following the drive signal, wherein the acoustic emitter/receiver sensor is a parking sensor, wherein said control unit is configured to recalibrate the output of the parking sensor for operation under water when the settling time of the diaphragm in the decay period following the drive signal indicates wading, so as to determine a distance from the vehicle to an immersed object.

2. A system according to claim 1 wherein the acoustic emitter/receiver sensor is an ultrasonic transducer.

3. A system according to claim 1 wherein the settling time is measured between successive activations of the sensor.

4. A system according to claim 1 wherein the control unit is configured to output a signal indicative of vehicle wading when the measured settling time of the diaphragm corresponds to a settling time of that diaphragm when under water and/or when the measured settling time of the diaphragm is significantly less than an expected settling time when the diaphragm is in air.

5. A system according to claim 1, further comprising a tilt sensor indicative of vehicle fore and aft inclination, said control unit being configured to predict depth of water at a pre-determined distance in advance of the vehicle.

6. A system according to claim 1, further comprising a water depth sensor.

7. A system according to claim 6, wherein said water depth sensor comprises a downward facing ultrasonic emitter/receiver device for detecting the surface of water.

8. A system according to claim 6, wherein said water depth sensor is enabled only when said acoustic emitter/receiver sensor indicates wading.

9. A vehicle including the system of claim 1.

10. A vehicle according to claim 9, wherein the system comprises at least two acoustic emitter/receiver sensors and wherein one of said at least two acoustic emitter/receiver sensors is positioned at the front of the vehicle and wherein one of said at least two acoustic emitter/receiver sensors is positioned at the rear of the vehicle.

11. The system of claim 1, wherein the control unit is configured to determine that the acoustic emitter/receiver sensor is disposed in water or air based on the measured settling time.

12. A method of detecting the presence of water comprising:
(i) driving an acoustic transducer with an oscillating electrical signal;
(ii) measuring, in a decay period following the oscillating electrical signal, the response of a diaphragm to said oscillating electrical drive signal;
(iii) determining a settling time of the diaphragm;
(iv) comparing the measured settling time of the diaphragm with an expected value of settling time of the diaphragm in water and/or in air; and
(v) recalibrating the output of the acoustic transducer for operation under water when the settling time of the diaphragm in the decay period following the drive signal indicates wading, so as to determine a distance from the vehicle to an immersed object.

13. The method of claim 12 further comprising: comparing the measured settling time of the diaphragm and if it is at least twice as fast as an expected settling time of the diaphragm when disposed in air, determining that the acoustic transducer is disposed in water.

14. The method of claim 12 comprising positioning the acoustic transducer on a lower part of a vehicle and using the step of comparing the measured settling time to determine that said vehicle is at least partially disposed in water up to the height of the positioned acoustic transducer.

15. The method of claim 12 comprising determining that the acoustic transducer is disposed in air or water based on the comparison of the measured settling time with the expected value of settling time of the diaphragm in water and/or in air.

16. The method of claim 12, further comprising using a time period from a termination of the oscillating electrical signal until the response signal decays to a threshold amplitude as the expected value of settling time of the diaphragm in water and/or in air.

17. A non-transient computer readable medium having stored thereon a program executable by a control unit to compare a settling time of a diaphragm of an acoustic emitter/receiver sensor, measured in a decay period following a drive signal applied to the acoustic emitter/receiver sensor, with an expected settling time of the diaphragm of the acoustic emitter/receiver sensor in air and/or with an expected settling time of the diaphragm of the acoustic emitter/receiver sensor in water, to determine whether the acoustic emitter/receiver sensor is disposed in water and to recalibrate the output of the acoustic emitter/receiver sensor for operation under water when the acoustic emitter/receiver sensor is disposed in water, so as to determine a distance from the vehicle to an immersed object.

18. The non-transient computer readable medium of claim 17 wherein the program is executable by the control unit to determine that the acoustic emitter/receiver sensor is disposed in water based on the comparison of the measured settling time with the expected settling time(s).

* * * * *